Aug. 4, 1942.  E. G. ARELT  2,291,675
FILING FOLDER AND INDEX TAB
Filed Nov. 13, 1941  3 Sheets-Sheet 1
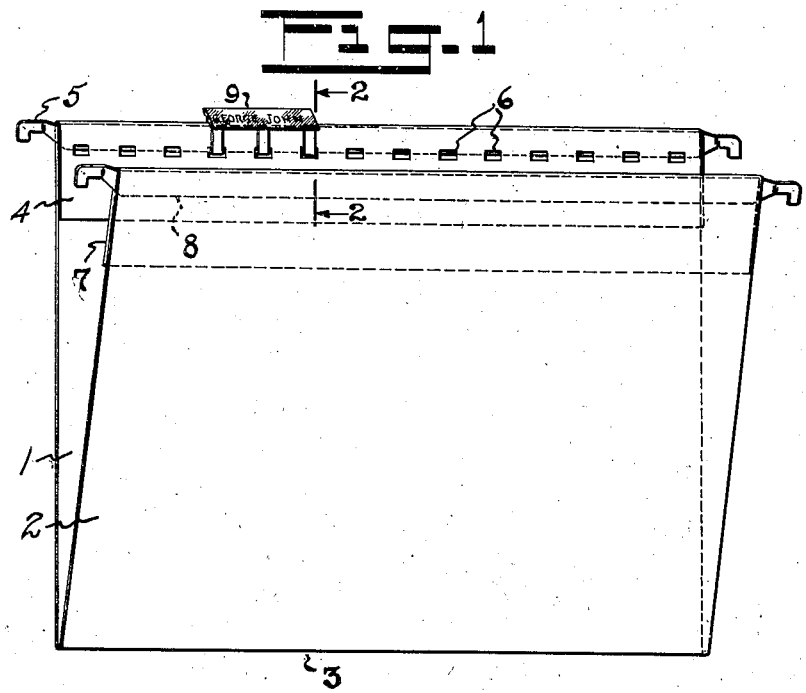
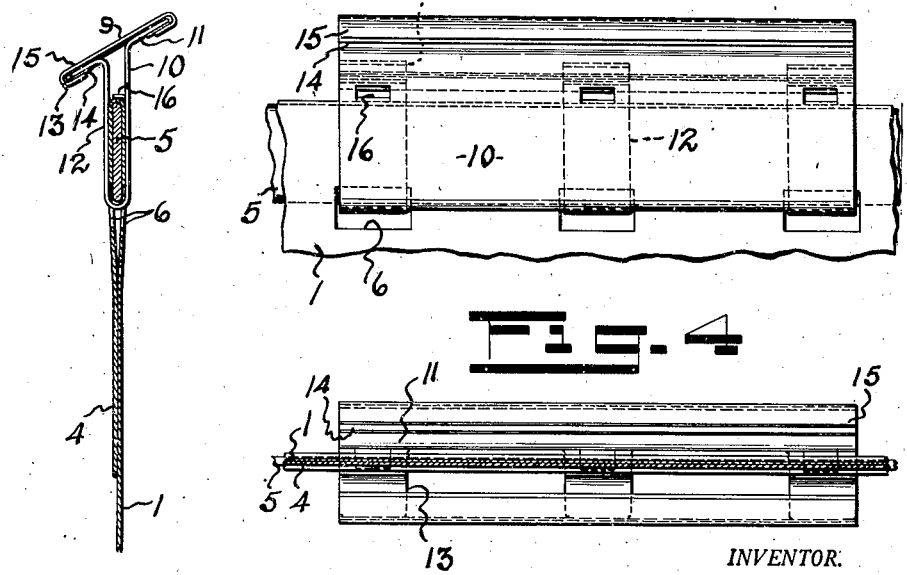
INVENTOR.
Eugene G. Arelt
BY
ATTORNEYS Aug. 4, 1942.  E. G. ARELT  2,291,675
FILING FOLDER AND INDEX TAB
Filed Nov. 13, 1941  3 Sheets-Sheet 2
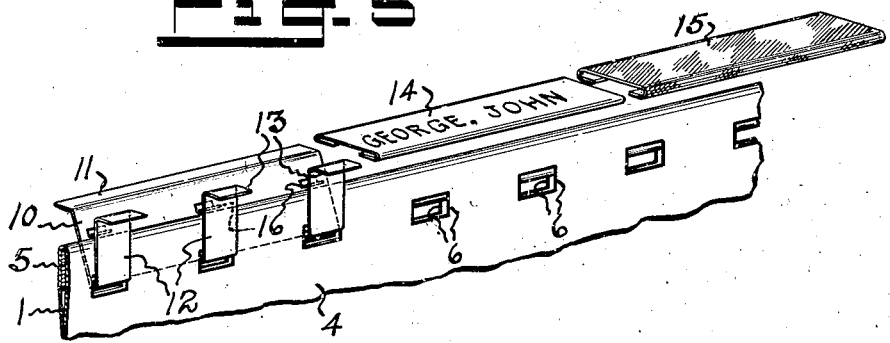
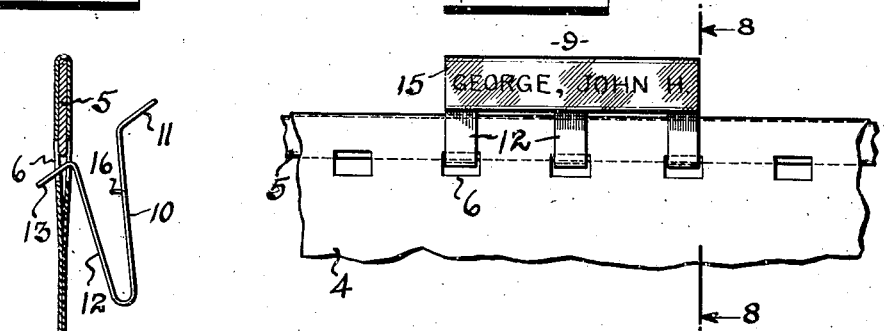
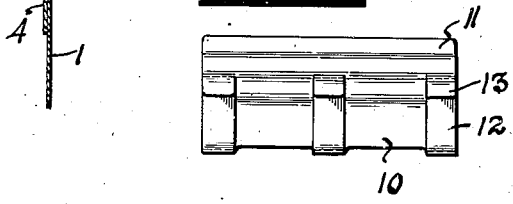
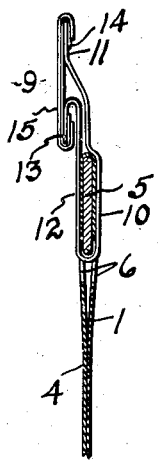
INVENTOR.
Eugene G. Arelt
BY Darby & Darby.
ATTORNEYS Aug. 4, 1942.   E. G. ARELT   2,291,675

FILING FOLDER AND INDEX TAB

Filed Nov. 13, 1941   3 Sheets-Sheet 3

INVENTOR.
Eugene G. Arelt
BY Darby & Darby
ATTORNEYS

Patented Aug. 4, 1942

2,291,675

UNITED STATES PATENT OFFICE 2,291,675

FILING FOLDER AND INDEX TAB

Eugene G. Arelt, Richmond Hill, N. Y., assignor to Oxford Filing Supply Co., Brooklyn, N. Y., a partnership composed of Richard A. Jonas, Richard A. Jonas, Jr., Robert P. Jonas, Frank D. Jonas, and Edward F. Jonas Application November 13, 1941, Serial No. 418,914

9 Claims. (Cl. 129—16.7)

This invention relates to improvements in filing folders especially but not necessarily of the suspension type in combination with a novel form of index tab.

The general object of this invention is to provide a new form of index tab for filing folders, filing cards and the like, characterized by a novel construction by means of which it may be easily attached to and removed therefrom and capable of attaching a plurality of filing folders together to form what might be termed an accordion-like assembly.

Other and more detailed objects of this invention will be apparent from the following full description of several embodiments thereof.

This invention resides substantially in a combination of construction, arrangement and relative location of parts as more fully will be set forth herein in connection with the attached drawings.

In the accompanying drawings

Figure 1 is a perspective view of the invention as applied to a suspension filing folder.

Figure 2 is a cross-sectional view taken on line 2—2 of Figure 1.

Figure 3 is an enlarged detailed rear elevational view of the index device as mounted.

Figure 4 is a bottom plan view of the structure of Figure 3.

Figure 5 is an exploded, perspective, broken, detailed view of the structure.

Figure 6 is a cross-sectional view taken on the line 2—2 of Figure 1 showing the method of mounting and removing the main body portion of the index tab.

Figure 7 is a front elevational broken view of a slightly modified form of the invention.

Figure 8 is a cross-sectional view taken on line 8—8 of Figure 7.

Figure 9 is a front elevational view of the main body portion of this modified structure.

Figure 10:
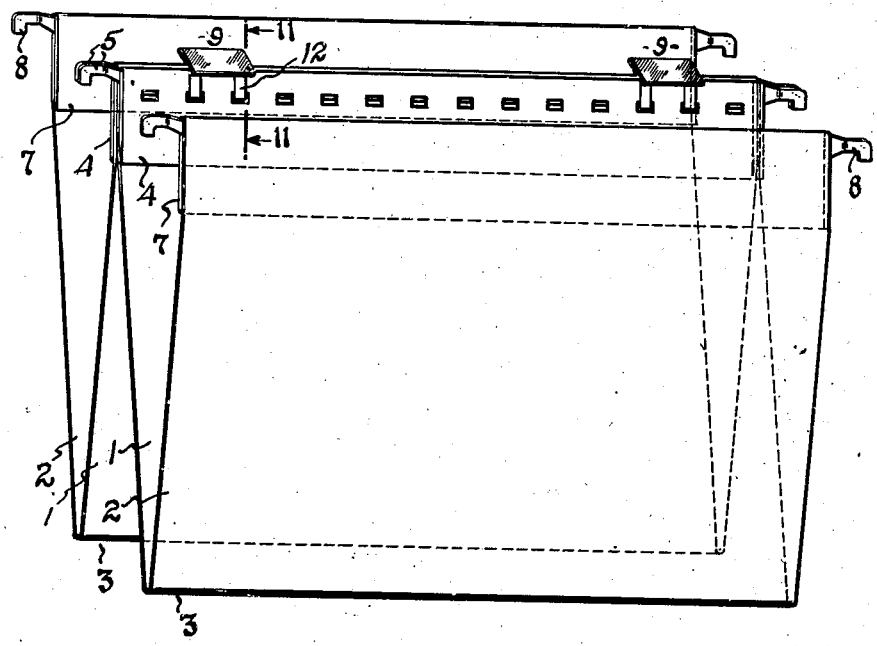
Figure 10 is a perspective view showing the index device employed to secure several filing folders together into accordion-like relation.

As will become more apparent as the description proceeds, the index tab of this invention is capable of use not only on filing folders generally, of which the suspension type is a specific example, but may also be used on index cards and the like. For the purpose of illustrating the invention, as is shown in Figures 1 to 6, inclusive, the index tab has been applied to a filing folder of the suspension type.

Such folders commonly comprise a single piece of suitable fibrous material folded as indicated at 3 upon a substantially medial transverse line to form the rear wall 1 and the front wall 2 which together form a receptacle. The top marginal edge 4 of the rear wall 1 is folded over and downwardly so as to overlie the front face of the rear wall to which it is secured in any suitable manner as by gluing. The area just below the fold line is left unglued to form a continuous channel in which a suspension bar 5 in any suitable form may be mounted. Similarly the marginal edge 7 of the front wall 2 is folded over and downwardly so as to overlie the inside face of the front wall 2 to which it is secured in any suitable manner as by means of an adhesive to leave a channel or passage in which the front suspension bar 8 is mounted.

The two plies of the folded portion of the rear wall are provided with a series of suitably spaced and relatively aligned apertures 6, as clearly shown in Figure 2, which are positioned so as to extend below the lower edge of the suspension bar 5 as is clear from the figures. The index tab indicated generally by the reference numeral 9 is mounted on the folder by portions extending through the apertures 6.

The index tab comprises a rear portion 10 having a terminal edge flange 11 lying at an angle thereto. At the lower edge of the portion 10 are a plurality of integral straps 12 which are bent with respect to the portion 10 so as to lie parallel thereto. The terminal ends 13 of the straps 12 are flanged so as to lie at an angle to the plane of the straps and in the same plane as the flange 11. This main body portion of the tab is mounted on the folder by threading the straps 12 through the apertures 6, as indicated in Figure 6, and then adjusted to the position shown in Figure 5. The data receiving insert strip 14, of paper for example, is applied over the flanges 11 and 13 and is shaped around the end edges thereof so that it will have the form indicated in Figure 5. In applying the insert the portion 10 and the straps 12 are compressed into parallel relation as indicated in Figure 2, and a transparent sheath, sufficiently rigid to be form sustaining, is slipped endwise onto the flanges 11 and 13 so as to overlie the insert 14 as clearly indicated in Figure 2. The insert provides continuous tracks upon which the sheath may slide without interference with the corners of the flanges 13. The main body portion of the index tab is preferably made of metal and if desired of a springy nature so that when clamped in position by the sheath all the parts will be firmly gripped and held in the desired relationship. The clamping action of the index tab serves to hold it in position and in addition resists any tendency of the suspension rod 5 to move endwise in its passage. This is a desirable function because at the present time it is common to provide some additional means to minimize the tendency of the suspension rod to become displaced. The necessity for such additional holding means is eliminated by the nature of the construction of the index tab. To further insure proper positioning of the index tab a series of short ears 16 are struck out from the portions 10 so that when in position these ears overlie the top edge of the folder as is best seen in Figure 2 to further aid in the clamping action and maintenance of the proper position of the structure.

As illustrated in the figures under discussion, the face of the tab lies at a slight inclination to the horizontal but the nature of the invention is such that it may be caused to lie at any angle and may even be made vertical as indicated in Figures 7 and 9 inclusive. In this case the main body portion 10 is shaped so that the flanges 11 and 13 extend substantially vertically. Thus the sheath and insert are in a vertical position. The portion 10 is offset in successive areas as indicated in Figure 8 so that it partially overlaps the top edge of the folder and therefore grips the folder and suspension bar when folded over into line by the sheath.

Figure 11:
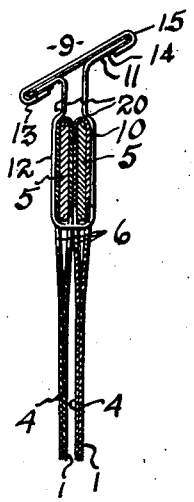
Figure 11 is a cross-sectional view taken on line 11 of Figure 10.

There is illustrated in Figures 10 and 11 the adaptation of the index device to the formation of an accordion-like arrangement of a plurality of filing folders. As illustrated in Figure 10 the folders are reversed so that the rear walls of the two folders lie in contiguous relation with their apertures 6 in alignment. In this case the straps 12 of the index device are threaded through the apertures of both the walls so that the index tab locks those walls together as is apparent from these figures. The portion 10 and the straps 12 are set as indicated at 20 to partially overlie the top edges of the folders and thereby clamp and grip all of the parts together and hold the index tab in correct position.

As has been illustrated in the various figures the holes 6 may extend with proper spacing throughout the width of the folder so that the index tabs may be applied at various transverse positions and when desired and as indicated in Figure 10 several of these tabs may be applied. It will, of course, be apparent that the tab structure is such that it may be applied in the same manner to filing cards and other filing necessities where tabs are required.

In the interests of completeness, it is to be noted that where only the two files are secured together as indicated in Figure 10 that they may be reversed and placed back to back as previously described but in the case where more than two files are to be connected, it will be necessary to have apertures 6 in both the front and back walls of each file in order that all of the files intermediate the two end files may be connected together in series.

From the above description it will be apparent to those skilled in the art that the principles of this invention may be embodied in various physical forms and I do not, therefore, desire to be strictly limited to the disclosure which has been given in an illustrative sense but rather to the full scope of the claims granted me.

What is claimed is:

1. The combination with a filing member formed of at least one wall having a plurality of apertures adjacent one edge thereof, of an index tab comprising a body portion and at least one integral strap, said body portion and strap having flanges lying in a common plane, the strap extending through one of the apertures of said wall and a sheath encasing said flanges to grip the structure to the wall.

2. The combination with a filing member formed of at least one wall having a plurality of apertures adjacent one edge thereof, of an index tab comprising a body portion and at least one integral strap, said body portion and strap having flanges lying in a common plane, the strap extending through one of the apertures of said wall, a sheath encasing said flanges to grip the structure to the wall and means formed on the body portion for engaging the top edge of said wall to position the tab structure vertically on the wall.

3. The combination with a filing member formed of at least one wall having a plurality of apertures adjacent one edge thereof, of an index tab comprising a body portion and at least one integral strap, said body portion and strap having flanges lying in a common plane, the strap extending through one of the apertures of said wall, a sheath encasing said flanges to grip the structure to the wall and at least one ear struck out from the main body portion and engaging the top edge of said wall.

4. In a suspension filing folder the combination comprising a receptacle formed by connected front and rear walls, suspension bars secured adjacent the free edges of said walls, one of said walls having a plurality of apertures overlapping the lower edge of the associated suspension bar, an index tab having fingers lying respectively in said apertures with flanged ends extending in opposite directions and a sheath engaging the flanges of said fingers so as to compress the adjacent portions of the wall therebetween.

5. In a suspension filing folder the combination comprising a receptacle formed by connected front and rear walls, suspension bars secured adjacent the free edges of said walls, one of said walls having a plurality of apertures overlapping the lower edge of the associated suspension bar, an index tab having one or more fingers lying in one or more of said apertures with flanged ends extending in opposite directions, a sheath engaging the flanges of said fingers so as to compress the adjacent portions of the wall therebetween, the associated suspension bar lying between said fingers and being gripped thereby.

6. In a suspension filing folder the combination comprising a receptacle formed by connected front and rear walls, suspension bars secured adjacent the free edges of said walls, one of said walls having a plurality of apertures overlapping the lower edge of the associated suspension bar, an index tab having fingers lying in said apertures with flanged ends extending in opposite directions, a sheath engaging the flanges of said fingers so as to compress the adjacent portions of the wall therebetween, and positioning members on said fingers engaging the top edge of the associated wall.

7. In a suspension filing folder the combination comprising a receptacle formed by connected front and rear walls, suspension bars secured adjacent the free edges of said walls, one of said walls having a plurality of apertures overlapping the lower edge of the associated suspension bar, an index tab having fingers lying in a corresponding number of said apertures with flanged ends extending in opposite directions, a sheath engaging the flanges of said fingers so as to compress the adjacent portions of the wall therebetween, the associated suspension bar lying between said fingers and being gripped thereby and positioning members on said fingers engaging the top edge of the associated wall.

8. A suspension filing folder combination comprising a plurality of filing folders each having front and rear walls arranged in contiguous relation, suspension bars attached to the top edges of said walls, said walls having apertures overlapping the lower edges of the associated suspension bars and index tab members threaded through the apertures of adjacent pairs of walls for binding them together.

9. A suspension filing folder combination comprising a plurality of filing folders each having front and rear walls arranged in contiguous relation, suspension bars attached to the top edges of said walls, said walls having apertures overlapping the lower edges of the associated suspension bars, index tab members threaded through the apertures of adjacent pairs of walls for binding them together, said index tab members each comprising a main body portion and integral straps with flanged ends and a clamping sheath encasing the flanged ends.

EUGENE G. ARELT.